(12) United States Patent
Kim

(10) Patent No.: US 6,795,100 B1
(45) Date of Patent: Sep. 21, 2004

(54) METHOD AND APPARATUS FOR CONTROLLING A LIGHT SIGNAL IN ELECTROPHOTOGRAPHIC DEVELOPING TYPE PRINTER

(75) Inventor: Yong-Geun Kim, Suwon (KR)

(73) Assignee: Samsung Electronics Co., Ltd, Suwon (KR)

( * ) Notice: Subject to any disclaimer, the term of this patent is extended or adjusted under 35 U.S.C. 154(b) by 0 days.

(21) Appl. No.: 08/250,770

(22) Filed: May 27, 1994

(30) Foreign Application Priority Data

May 31, 1993 (KR) .......................................... 1993-9481

(51) Int. Cl.[7] .............................. B41J 2/385; B41J 2/47
(52) U.S. Cl. ..................................... 347/131; 347/254
(58) Field of Search ................................ 347/131, 137, 347/240, 247, 249, 251, 254, 132, 133, 253, 135, 128, 237, 183, 195; 358/400, 296, 300; 346/108; 345/204

(56) References Cited

U.S. PATENT DOCUMENTS

| | | | |
|---|---|---|---|
| 3,702,447 A | 11/1972 | Koning | |
| 3,894,182 A | 7/1975 | Yamamoto et al. | |
| 4,232,954 A | 11/1980 | Kitamura et al. | |
| 4,367,948 A | 1/1983 | Suzuki | |
| 4,698,692 A | 10/1987 | Fry et al. | |
| 4,806,949 A * | 2/1989 | Onuma et al. | 347/183 |
| 4,918,462 A * | 4/1990 | Tomita et al. | 347/237 |
| 4,987,484 A | 1/1991 | Ikeda et al. | |
| 4,989,039 A * | 1/1991 | Hayashi et al. | 347/133 |
| 5,061,949 A | 10/1991 | Ogino et al. | |
| 5,206,664 A * | 4/1993 | Sasaki et al. | 346/108 |
| 5,250,939 A * | 10/1993 | Takanashi et al. | 345/204 |
| 5,283,658 A | 2/1994 | Hayashi et al. | |
| 5,283,662 A * | 2/1994 | Nakajima | 358/409 |
| 5,285,221 A | 2/1994 | Sumiyoshi et al. | |
| 5,625,399 A * | 4/1997 | Wiklof et al. | 347/195 |

* cited by examiner

Primary Examiner—Hai Pham
(74) Attorney, Agent, or Firm—Robert E. Bushnell, Esq.

(57) ABSTRACT

An optical signal control process and circuit providing an improved electronic photography method reproduction apparatus. The reproduction apparatus has a data transmitting unit converting data to be printed to a series of video data in accordance with a first clock signal and transmitting the converted video data in response to a horizontal synchronization signal applied with a predetermined time interval, and a printing control unit for controlling a mechanism used to print the video data by sending electrical signals, providing beam data used to switch the light generation of a light source element controlled by chopped chopping video data applied to the light source element, and generating the horizontal synchronization signal on the basis of a beam detection signal produced by the light source element. A chopping unit is connected between the data transmitting unit and the printing control unit, for chopping the converted video data output from the data transmitting means in response to a second clock signal and for providing the chopped data as the chopping video data. Accordingly, the chopped video data is transmitted as beam data by the printing control unit and is then used to control the amount of light exposed on the photosensitive drum. The amount of the light is controlled optimally by the variable selection of the frequency of the second clock signal.

11 Claims, 4 Drawing Sheets

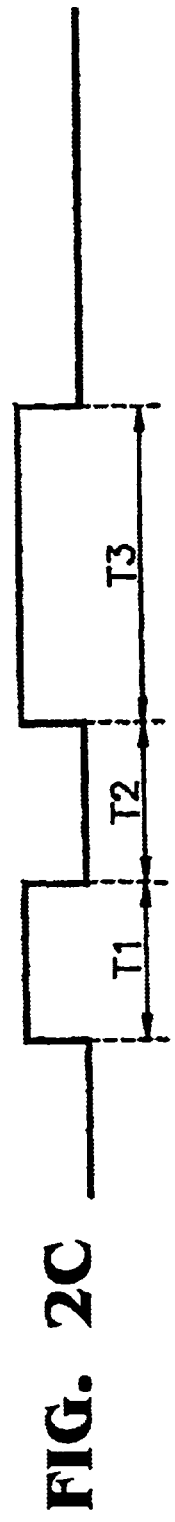
FIG. 2A
FIG. 2B
FIG. 2C
FIG. 2D

METHOD AND APPARATUS FOR CONTROLLING A LIGHT SIGNAL IN ELECTROPHOTOGRAPHIC DEVELOPING TYPE PRINTER

CLAIM OF PRIORITY

This application makes reference to, incorporates herein and claims all benefits accruing under 35 U.S.C.§119 from our application earlier filed in the Korean Industrial Property Office on May 31, 1993 of our application entitled Method and Apparatus for Controlling a Light Signal in Electrophotographic Developing Type Printer, which application was duly assigned Serial No. 9481/1993.

BACKGROUND OF THE INVENTION

The present invention relates to an electrophotographic recording, and more particularly to an apparatus and method for selectively controlling the amount of light exposed onto a photosensitive drum without being controlled by a developing unit when the apparatus prints printing information.

Generally, the art of printing using an electrophotographic developing technique is well known as xerography. The apparatus whether a laser beam printer, facsimile or photocopier, as its basic principle, utilizes an adhesive force of static electricity and an optically conductive semiconductor with differences in electricity conducting rates controlled according to exposure to the light. Among these printers, the laser beam printer is a printing device that uses a laser diode as its light source instead of a special fluorescent lamp or a mercury lamp, and prints the printing data provided as, for example, video data for a source such as a computer, etc., on a printable medium such as individual sheets of printing paper, instead of merely reproducing images reflected from a document. As described above, recently developed laser printers, in comparison with the conventional impact printers that print letters by using hammers striking a platen, have a higher printing speed, lower noise level, and form finer shapes of printed letters. Also, they are very popular and widely used because they are easily linked with computers to receive signals conveying information to be printed such as a text signal of a video signal.

The printing process of such laser beam printers includes a developing stage where a toner used as a developing material is attracted to a latent image formed on the photosensitive drum by exposure of the photosensitive drum to light, a transferring stage where the toner attracted to the drum is transferred to a printable medium such as a sheet of paper fed by a feed roller, and a fusing stage where the toner that had been transferred onto the printable medium is fused is then fused onto the printable medium. These stages of the process also are generally known in the current art.

In the printing process mentioned above, it is the developing stage that is closely related to a consumption of the toner, and that directly affects the printing quality. Moreover, in order for a conventional printer to control the printing density, the bias voltage of a developer is changed to adjust the amount of the toner developed. See, by way of further explanation, the IMAGE FORMING APPARATUS COMPRISING MEANS FOR SETTING A PROPER BIAS VOLTAGE OF LASER EMITTING MEANS AND METHOD THEREFORE by S. Ogino, et al, U.S. Pat. No. 5,061,949. In one contemporary approach to control printing density, a print control unit controls printing of video data with electrical signals and supplies beam data, used during scanning of an image onto the circumstantial exterior surface of the drum with a beam of light emitted by the light source element video data signal. This may be seen in for example, the PICTURE REPRODUCING APPARATUS of M. Yamamoto, et al., U.S. Pat. No. 3,894,182. Also, the print control unit receives beam detection signals generated by the light source element and supplies a horizontal synchronization signal and a bias voltage control signal to a bias voltage generator that provides the bias voltage to the developer.

The amount of toner attached on the drum during the developing stage is determined by the bias voltage and the intensity of the bias voltage is controlled by an adjusting terminal known as a printing density selecting switch, installed on the control panel in an external stage of the printer. A printer using this approach to control of printing density is very inconvenient to use however, because the printing density has to be adjusted for each use. Moreover, this approach requires intense, uninterrupted concentration from the user. Also, it is very hard for unskilled users to accurately and repeatedly adjust the adjustment terminal. Frequently, the durability of the photosensitive drum in such laser printer is shortened and the toner consumption is increased when the user fails to adjust the bias voltage properly.

SUMMARY OF THE INVENTION

Accordingly, it is an object of the present invention to provide an improved printing process and apparatus.

It is another object to provide a method and apparatus for selectively controlling the amount of light illuminating the photosensitive drum without controlling the developing unit when an image is printed with a laser beam being used as a light signal.

It is a further object to provide a laser reproduction process and printer offering an optimum printing quality by automatically, internally selecting the amount of light illuminating the photosensitive drum.

It is a still further object to provide a laser printing process and printer having a simple circuit externally adjusting the sharpness of characters, symbols, and graphs to be printed during the process.

It is a yet further object to provide a process and control circuit for reliably controlling toner consumption in an electrophotographic developer.

It is a still yet further object to enable a user of an electrophotographic developer type printer to transmit to a printer data controlling print quality while transmitting data defining the images to be printed by the printer.

These and other objects mentioned above, may be achieved according to the principles of the present invention with a process and an apparatus using a data transmitting unit converting video data in response to a horizontal synchronization signal applied with a predetermined time interval by converting data to be printed into a series of lines of serial video data in accordance with a first clock signal, and a printing control unit regulating a mechanism used to print the video data by generating electrical signals representing the video data, providing beam data used to switch the generation of light provided by a light source element that had been obtained from chopped video data applied to the light source element, and generating a horizontal synchronization signal by processing a beam detection signal produced by the light source element. A chopping unit connected between the data transmitting unit and the printing control unit chops the converted video data received from the data transmitting unit in response to a second clock signal, and provides the chopped video data.

According to the present invention, printing may be performed by converting data to be printed into a series of lines of video data in accordance with a first clock signal and transmitting the converted video data in response to a horizontal synchronization signal exhibiting a predetermined time interval. Chopped video data is generated by chopping the converted video data in response to a second clock signal; and beam data obtained from the chopped video data is supplied for controlling the light generation of a light source element. The horizontal synchronization signal is operated by processing a beam detection signal resulting from the beam of light produced by the light source element.

In the practice of the present invention, the frequency of the first clock signal is set to be either equal to or lower than the frequency of the second clock signal. If the frequency ratio between the first and second clock signals is an integer multiple, a single divider stage may be used; the first and second clock signals should then be generated from different output terminals of the divider stage.

According to the configuration and method of the present invention, the chopped video data is generated by the printing control unit as beam data, and is then used for controlling the amount of light illuminating the photosensitive drum. The amount of the light is optimally controlled by selecting the second clock signal. Therefore, the user can adjust the density of printed images by designating or selecting the data defining the amount of light exposed by means of software. By doing so, the sharpness of the printed images can be easily adjusted without adjusting the bias voltage of a developing unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2A to 2D are exemplary timing charts illustrating waveforms to explain an operation of the process represented by FIG. 1.

DETAILED DESCRIPTION OF THE INVENTION

Figure 1:
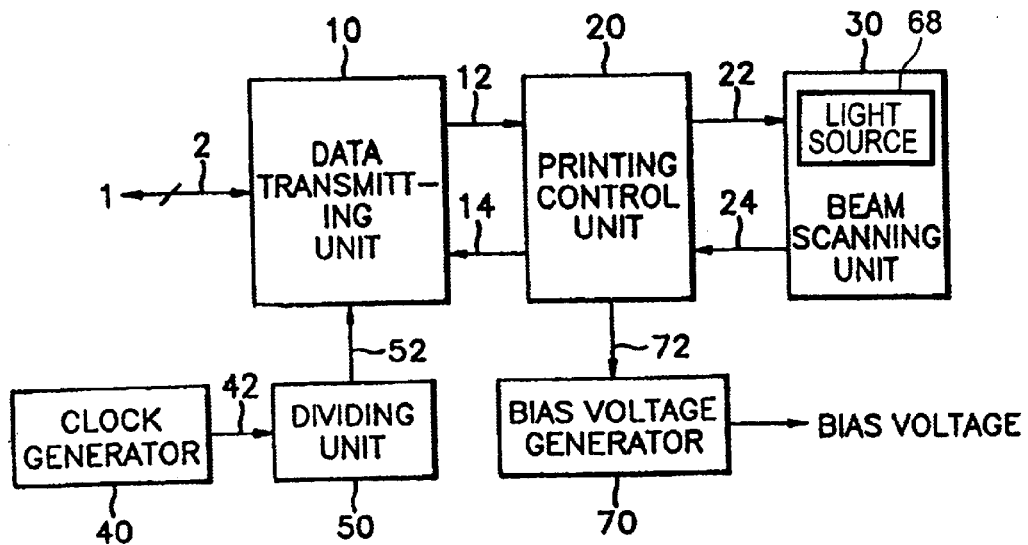
FIG. 1 is a block diagram used to provide an abstract representation showing a simplification of a typical electrophotographic developing type printing process.

In contemporary printing processes described earlier herein, the developing stage that is closely related to consumption of the toner, and therefore directly affects the printing quality. Moreover, in order for a conventional reproduction apparatus to control the printing density, the bias voltage of the developer is typically changed in contemporary printers in order to adjust the amount of the toner consumed. Referring now to FIG. 1, a diagram illustrating an exemplary conventional technique for accomplishing printing control is shown in an abstract representation to facilitate an understanding of the principles of the present invention. As shown in FIG. 1, data transmitting unit 10 receives printing data supplied from data output device 1 of a source such as a computer having a RIP (Raster Image Processor), via a bus line 2. Also, transmitting unit 10 converts the print data to a series of lines of video data in correspondence with a clock signal fed in via a line 52 and then, outputs the converted video data via line 12 in response to a horizontal synchronization signal exhibiting a predetermined time interval applied via a line 14. Data transmitting unit 10 contains a shift register type of memory element. A printing control unit 20 controls a mechanism required for printing the video data with electrical signals and supplies beam data, used to switch the light generation of a light source element located in a beam scanning unit 30, to the light source element through a line 22 by obtaining the beam data via a line 12 from the video data received. Also print control unit 20 receives beam detection signals generated by the light source element 68 for processing via a line 24 and then, supplies the horizontal synchronization signal to the line 14. In addition, the printing control unit 20 supplies a bias voltage control signal via a line 72 to a bias voltage generator 70. Thus, the bias voltage generator 70 provides a bias voltage to the developer not illustrated.

The beam scanning unit 30 is switched over according the beam data provided on the line 22 to generate the laser beam to be scanned upon the photosensitive, uniformly changed circumferential surface of the drum. Also, beam scanning unit 30, in response to the beam generated, sends beam detection signals to a line 24. A clock signal generator 40 supplies a basic clock signal of system to a dividing unit 50 via a line 42. The dividing unit 50 divides the basic clock signal into a certain ratio and then supplies the divided clock signal to the data transmitting unit 10 via a line 52 as the clock signal.

The timing relationship of waves output from each stage mentioned above is illustrated in FIGS. 2A to 2D. Referring to FIGS. 2A to 2D, if an assumption that FIG. 2A is a waveform of the line 42, FIG. 2B is a waveform of the line 52, and FIG. 2C is a waveform of the line 12, is made, FIG. 2D is output from the line 22. As illustrated by the examples given here, one dot is printed on an interval T1 in the waveform of FIG. 2C as black and another dot is printed on an interval 12 as white (e.g., as by not applying toner to the corresponding spot on the photosensitive drum). During interval T3, two dots are printed as black (i.e., successive dots of toner are fixed to the printed medium passing through the reproduction apparatus).

Referring again to FIG. 1, the light source element in the beam scanning unit 30 emits light according to the waveform of FIG. 2D that is fed in via the line 22 and the beam scanning unit 30 scans the emitted laser beam onto the photosensitive drum. Therefore, the developing stage is implemented. Note that the amount of toner attached on the drum during the developing stage is determined by the bias voltage of the bias voltage generating unit 70 that generates the bias voltage in response to the bias voltage control signal on the line 72. The generating unit 70 is has a circuit element capable of outputting a high-voltage and an adjusting terminal used for adjusting the voltage externally. Where, the bias voltage control signal on the line 72 is a signal to switch a generation of the bias voltage, substantially the intensity of the bias voltage is controlled by the adjusting terminal installed in external stage of the printer. The adjusting terminal is well known as a printing density selecting switch on the control panel. Thus, such control of the bias voltage in the developing unit is generally known in the art. For example, where the surface of the photosensitive drum has a voltage potential of −600 volts on charging, and has a voltage potential of −50 volts on exposing, the bias voltage adjusted as −500 volts provides, a higher printing density in comparison with the bias voltage adjusted as −400 volts.

This reproduction apparatus is very inconvenient to use because the printing density has to be adjusted for each use. Furthermore, doing so requires a great concentration from the users. Also, it is very hard for the unskilled users to adjust the adjustment terminal. Frequently, the durability of the photosensitive drum in such laser printer is shortened and the toner consumption is increased when failing to adjust bias voltage properly.

In the following paragraphs, a light signal controlling apparatus constructed as preferred embodiments in accordance with the principles of the present invention will be described. To provide a more thorough understanding of the present invention, the detailed description on these circuits is given. Those skilled in the art however, will clearly recognize that the present invention can be implemented without unnecessarily detailed descriptions. Also, well known circuit characteristics and its functions are not explained in detail so as not to obscure an embodiment of the present invention. Further, the stages that are the same as those of the conventional techniques described previously will be assigned with the same reference numerals.

Figure 3:
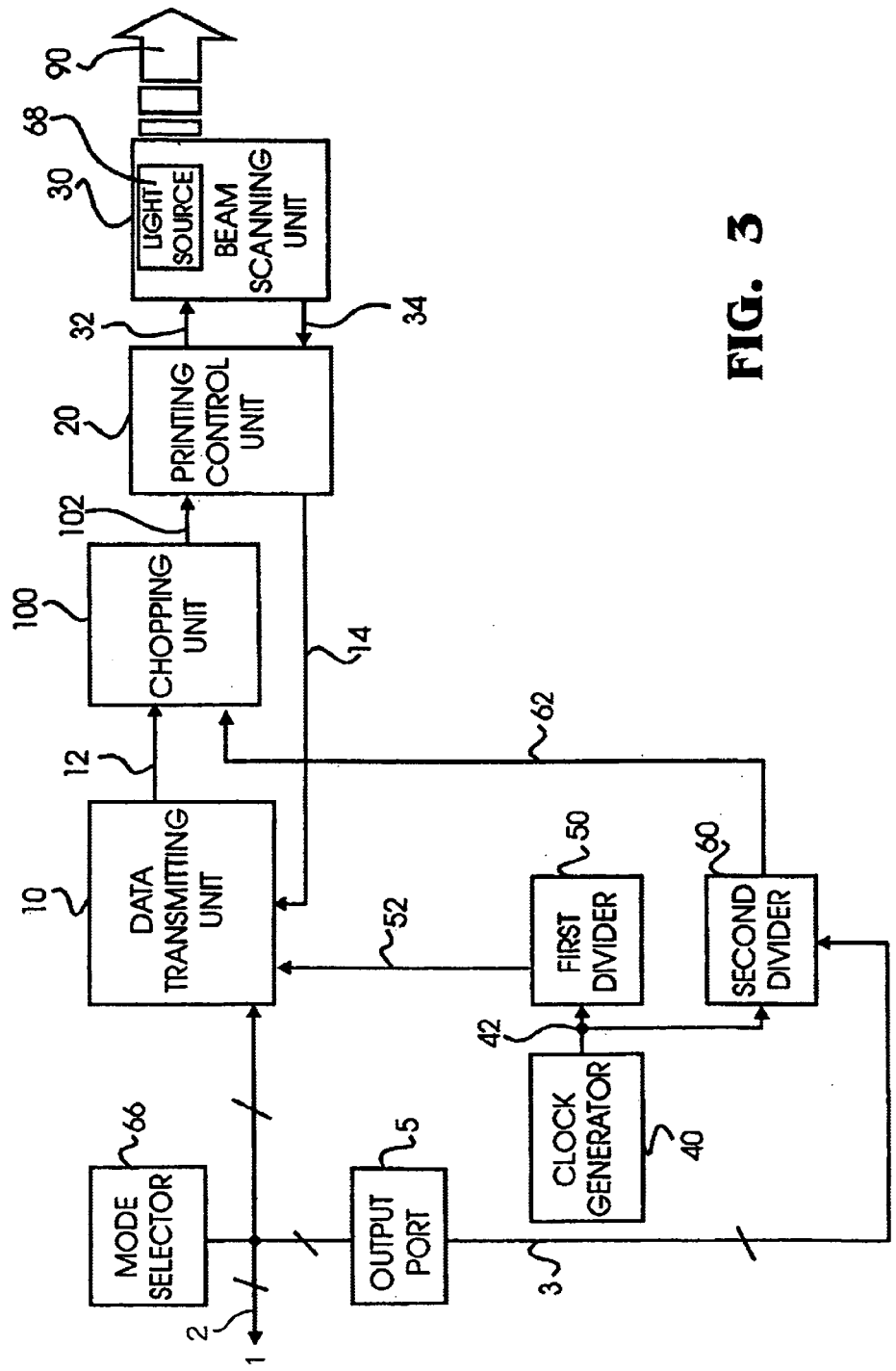
FIG. 3 is a block diagram illustrating an apparatus for controlling the light signal in an embodiment constructed according to the principles of the present invention.

Referring now to FIG. 3 where an illustration explaining the preferred embodiments of the present invention is given, data transmitting unit 10 receives the video data to be printed via data bus line 2 and converts the data received into serial of video data according to the first clock signal provided via a line 52 and, by responding to the horizontal synchronization signal exhibiting a predetermined time interval that is fed in on line 14, transmits the converted video data through line 12. A printing control unit 20 controls the mechanism required for printing the video data by means of electrical signals and provides the beam data used to switch the light generation of light source element 68 located in the beam scanning unit 30 to the light source element via a line 32 to emit light beam 90. The beam data is obtained from the chopped video data fed in via a line 102. Also the printing control unit 20 receives and processes the beam detection signals generated by the light source element through a line 34, and provides via line 14 the horizontal synchronization signal generated by processing the beam detection signals. Note that the printing control unit 20 is generally called an engine control unit. Also, for the light source element, a semiconductor laser capable of producing 0.6 milli-Watts is used.

A chopping unit 100 is preferably constructed using an logic stage such as an AND gate having one input port coupled to receive serial video data via lead 12 from data transmitting unit 10 and a second input port coupled to receive the second clock signal via lead 62; the output port of the logic stage such as an AND gate would be coupled to printing control unit 20. During operation of the chopping unit 100, the data generated by chopping the converted video data applied through lead 12 in response to the second clock signal fed in via a lead 62, is provided to lead 102 as the chopped video data. Here, the term "chopped" means that the video data is divided according to the second clock signal. This is carried out by gating of the AND gate with the second clock signal.

A clock signal generator 40 generates local, or basic, clock signals and then, applies these clock signals to a lead 42. A first divider 50 divides the basic clock signals with a certain dividing ratio and, then provides the first clock signal to lead 52. A second divider 60 divides the basic clock signal according to dividing ratio data component of the video data received via lead 2, separated from the video data through output port 5 and fed in through a line 3 and then, provides the second clock signal on a line 62, where, the second divider 60 may have a PWM function. An output port 5 is connected between the data bus line 2 and the line 3, and stores the dividing ratio data. Here, line 2 is normally made up of sixteen bits or thirty-two bits, and line 3, eight bits. That is, the data output device 1 such as a computer connected through the line 2, provides designated dividing ratio data as a component of the video data signal transmitted via lead 2, in accordance with the selection by the user and the printing data.

Figure 4A:
FIGS. 4A to 4G are timing charts illustrating waveforms of signals occurring at corresponding stages in the circuit shown in FIG. 3.
Figure 4B:
Figure 4C:
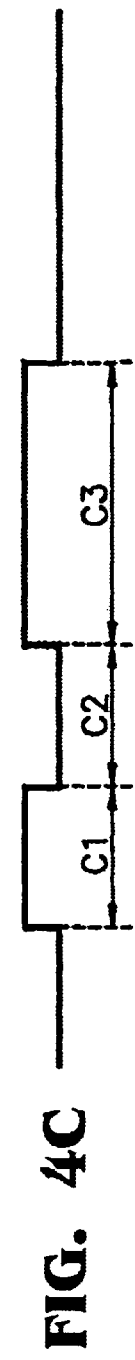
Figure 4D:
Figure 4E:
Figure 4F:
Figure 4G:

After assuming that the dividing ratio data is designated via the data output device 1, referring to FIGS. 4A to 4G with an illustration describing the chopping operation carried out by the chopping unit 100, a waveform of FIG. 4E is output on the output line 102 of the chopping unit 100 if an assumption that waveforms of FIGS. 4A, 4B, 4C, and 4D are output respectively on the line 42, the line 52, the line 12, and the line 62 in FIG. 3 is given. Intervals C1, C2, and C3 in the waveform of FIG. 4C are the same as those of T1, T2, and 13 in FIG. 2. Note that the number of high pulses as shown in the intervals E1, E3 in the waveform of FIG. 4E will be larger than the number of pulses in the waveform of FIG. 4C. Also, the waveform of FIG. 4E is changed to the waveform of FIG. 4G in case the waveform of FIG. 4D changes to a waveform of FIG. 4F. That is, if the frequency of the second clock signal provided by second divider 60 to line 62 is changed by a user applying video data via lead 2 containing a dividing ratio component that is greater by a factor of two than the dividing ratio that was applied to second divider 60 to produce the second clock signal with the pulse frequency shown in FIG. 4D, the frequency of the second clock signal will be correspondingly changed to provide the waveform illustrated in FIG. 4F exhibiting a pulse frequency twice that of the second clock signal waveform illustrated in FIG. 4D; concomitantly, the frequency of the chopped video data transmitted by chopping unit 102 via line 102 also changes by a factor of two, as is illustrated by with waveform of FIG. 4G.

Accordingly, the printing control unit 20 inputs the chopped video data through the line 102 and then, printing control unit 20 outputs the beam data for switching the light source element through line 32. Here, the beam data is almost the same as that on line 102. In response is to this data, light source element 68 in beam scanning unit 30 lights up to generate laser beam 90. Laser beam 90 generated by light source element 68 has a wavelength of 650 to 800 nM, generally.

Also, the faster the second clock signal operates the greater the number of chopping operations occur. As a result, the effective amount of light illuminating the photosensitive drum decreases. On the contrary, when the user designates a smaller dividing ratio data by using softwear (e.g., abstractly represented by mode selector 66) to specify the dividing ratio component of the video data transmitted via data bus 2 in order to lower the frequency of the second clock signal (i.e., to set the second frequency to a lower value), the chopped video data transmitted via line 102 has a lower pulse frequency and consequently, the amount of light emitted by source 68 increases. Accordingly, the amount of light to which each point on the photosensitive surface of the drum is exposed is increased and thus, the density of the toner is increased. In this manner, printing quality, that is, the sharpness of printed images, is determined by changing the amount of toner attached during the developing process according to the change in the amount of light emitted by light source 68 of beam scanning unit 30, and thus, the amount of light illuminating the exterior circumferential surface of the photosensitive drum.

Figure 5:
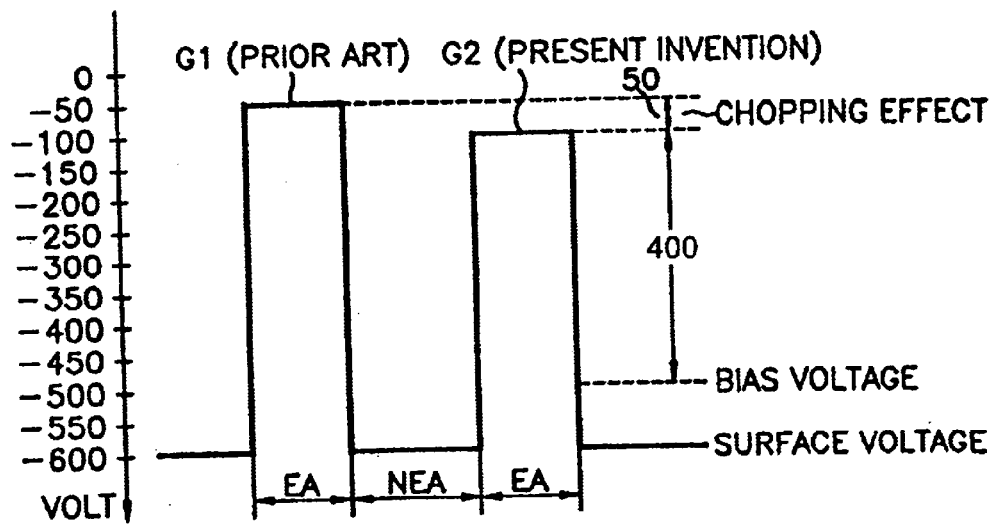
FIG. 5 is a graph illustrating a comparison of voltage potential on the photosensitive drum for an embodiment of the present invention and for an exemplary embodiment of prior art.

It is widely known that the amount of light illuminating the photosensitive drum is proportional to the light output of laser source 68 and that an exposure time per one dot of laser beam, and is inversely proportional to the optical area per one dot of the laser beam. Here, referring to FIG. 5, the pulse G2 represents the chopping effect in accordance with the present invention. In pulse G2, the voltage potential on the photosensitive drum is less than the voltage potential across the same photosensitive drum with the prior art of pulse G1 by about 50 volts. In FIG. 5, the intervals EA and NEA represents the exposed area and the unexposed area on the photosensitive drum, respectively. Therefore, the amount of toner attracted to the drum decreases since the voltage potential is lowered by chopping unit 100.

So far, the present invention has been explained with the drawings attached and examples given. If should be clear to those familiar with this field that several changes and modifications on the invention are possible if they are implemented within the scope of the techniques utilized in the present invention.

What is claimed is:

1. A printing apparatus for printing video data generated by a computer, comprising:
    a data bus connected to said computer, said data bus having a first data line for conveying input video data generated by said computer to said printing apparatus and a second data line for conveying dividing ratio data generated by said computer, and accompanying said input video data, to said printing apparatus;
    an output port connected to said second data line for receiving and storing said dividing ratio data;
    a clock signal generator for generating a local clock signal exhibiting a plurality of pulses characterized by a first frequency;
    a first divider for generating a first clock signal by dividing pulses of said local clock signal, said first clock signal having a plurality of pulses characterized by a second frequency different from said first frequency;
    a second divider for generating a second clock signal by dividing said pulses of said local clock signal in dependence upon the stored dividing ratio data, the stored dividing ratio data being output from said output port, said second clock signal having a plurality of pulses characterized by a third frequency different from said first and second frequencies and established in dependence upon said stored dividing ratio data;
    a data transmitter for converting said input video data into serial video data in response to said first clock signal, and for transmitting said serial video data in response to a horizontal synchronization signal;
    a chopping unit for receiving said serial video data transmitted by said data transmitter, and in response to said second clock signal, generating chopped serial video data;
    a print controller for generating beam data in response to said chopped serial video data; and
    a laser beam generator for generating a scanning laser beam for defining images corresponding to said beam data, and generating a beam detection signal derived from the scanning of said scanning laser beam; and
    said print controller generating said horizontal synchronizing signal in response to said beam detection signal.

2. The printing apparatus as set forth in claim 1, said chopping unit comprising an AND gate having a first input port coupled to receive said serial video data transmitted by said data transmitter and a second input port coupled to receive said second clock signal.

3. The printing apparatus as set forth in claim 2, further comprised of a mode selector enabling a user to change a characteristic of said second clock signal.

4. The printing apparatus as set forth in claim 2, further comprised of a mode selector enabling a user to double the frequency of said second clock signal.

5. The printing apparatus as set forth in claim 1, further comprised of a mode selector enabling a user to change a characteristic of said second clock signal.

6. A printing apparatus for printing video data generated by a computer, comprising:
    a data bus connected to said computer, said data bus having a first data line for conveying input video data generated by said computer to said printing apparatus and a second data line for conveying dividing ratio data generated by said computer, and accompanying said input video data, to said printing apparatus;
    an output port connected to said second data line for receiving and storing said dividing ratio data;
    a clock signal generator for generating a local clock signal exhibiting a plurality of pulses characterized by a local frequency;
    a clock divider for dividing pulses of said local clock signal to generate a first clock signal and a second clock, said first clock signal having a plurality of pulses characterized by a second frequency different from said local frequency, and said second clock signal being established in dependence upon said stored dividing ratio data to having a plurality of pulses characterized by a third frequency different from said local and first frequencies;
    a data transmitter for converting said input video data into serial video data in response to said first clock signal, and for transmitting said serial video data in response to a horizontal synchronization signal;
    a chopping unit for receiving said serial video data transmitted by said data transmitter, and in response to said second clock signal, generating chopped serial video data;
    a print controller for generating beam data in response to said chopped serial video data; and
    a laser beam generator for generating a scanning laser beam for defining images corresponding to said beam data, and generating abeam detection signal derived from the scanning of said scanning laser beam; and
    said print controller generating said horizontal synchronizing signal in response to said beam detection signal.

7. The printing apparatus as set forth in claim 6, further comprised of a mode selector enabling a user to double the frequency of said second clock signal.

8. The printing apparatus as set forth in claim 7, said chopping unit comprising an AND gate having a first input port coupled to receive said serial video data transmitted by said data transmitter and a second input port coupled to receive said second clock signal.

9. The printing apparatus as set forth in claim 6, said chopping unit comprising an AND gate having a first input port coupled to receive said serial video data transmitted by said data transmitter and a second input port coupled to receive said second clock signal.

10. A method for controlling a laser signal in an electrophotographic developing type reproduction apparatus, said method comprising the steps of:

conveying input video data, generated by a data source, to said electrophotographic developing type reproduction apparatus over a data bus connected to said data source;

conveying dividing ratio data, generated by said data source, to said electrophotographic developing type reproduction apparatus over said data bus connected to said data source;

separating said dividing ratio data from said input video data;

storing the dividing ratio data, separated from said input video data, in memory;

generating a local clock signal exhibiting a plurality of pulses characterized by a first frequency;

generating a first clock signal by dividing pulses of said local clock signal, said first clock signal having a plurality of pulses characterized by a second frequency different from said first frequency;

outputting said dividing ratio data from said memory;

generating a second clock signal by dividing said pulses of said local clock signal in dependence upon the dividing ratio data output from said memory, said second clock signal having a plurality of pulses characterized by a third frequency different from said first and second frequencies and established in dependence upon said stored dividing ratio data;

converting said input video data into serial video data in response to said first clock signal, and transmitting said serial video data in response to a horizontal synchronization signal;

receiving said serial video data transmitted by said data transmitter, and in response to said second clock signal, generating chopped serial video data;

generating beam data in response to said chopped serial video data; and generating a scanning laser beam for defining images corresponding to said beam data, and generating a beam detention signal derived from the scanning of said scanning laser beam; and generating said horizontal synchronizing signal in response to said beam detection signal.

11. The method as set forth in claim 10, further comprising a step of doubling the frequency of second clock signal.

* * * * *